United States Patent [19]

Rigazio

[11] 4,031,295

[45] June 21, 1977

[54] COMBINATION HOUSING WITH COMPARTMENT AND EJECTOR MECHANISM FOR EJECTING A BATTERY THEREFROM

[75] Inventor: Anthony W. Rigazio, Oglesby, Ill.

[73] Assignee: General Time Corporation, Thomaston, Conn.

[22] Filed: Mar. 11, 1976

[21] Appl. No.: 665,793

[52] U.S. Cl. .............................. 429/100; 260/804
[51] Int. Cl.$^2$ ........................................ H01M 2/10
[58] Field of Search ................ 429/96, 97, 98, 99, 429/100; 206/333, 804; 221/191, 192

[56] References Cited
UNITED STATES PATENTS

| | | | |
|---|---|---|---|
| 2,430,707 | 11/1947 | Cahn | 206/804 |
| 3,181,974 | 5/1965 | Barbera | 429/100 |
| 3,445,297 | 5/1969 | Sidell | 136/173 |

FOREIGN PATENTS OR APPLICATIONS 180,640  8/1966  U.S.S.R. .............................. 429/98

Primary Examiner—Donald L. Walton
Attorney, Agent, or Firm—Pennie & Edmonds

[57] ABSTRACT

A housing includes a compartment into which a battery is received and an ejector mechanism formed integrally therewith. The ejector mechanism is formed by a pair of lever arms extending from a hinge in one wall of the compartment. One lever arm extends from the compartment wall while the other lever arm follows the compartment wall, terminating at a location below the battery. Finger pressure on the former lever arm results in the ejector mechanism pivoting about the hinge so that the latter lever arm engages with to partially eject the battery supported by the housing between a pair of terminals from the compartment. The terminals each carry a raised rounded portion on a spring arm contacting the battery. The raised rounded portions act as obstructions so that the battery, once ejected, is not permitted to return to the supported position.

5 Claims, 4 Drawing Figures

COMBINATION HOUSING WITH COMPARTMENT AND EJECTOR MECHANISM FOR EJECTING A BATTERY THEREFROM

BACKGROUND OF THE INVENTION

The present invention relates to a housing having a compartment into which a battery is received and an ejector mechanism formed integrally with the housing. The ejector mechanism includes means engageable below for ejecting partially the battery from the compartment. Particularly, the ejector mechanism comprises a pair of lever arms extending from a hinge whereupon pressure on one lever arm causes a pivoting action thereby to eject the battery from a position of engagement between a pair of terminals forming a portion of an electrical circuit. In this manner, the battery which otherwise substantially is enclosed by the compartment may be readily and easily grasped and removed for replacement, as necessary.

Structures of the type generally described above are known in the prior art. One structure which is representative of the prior art is illustrated and described in Sidell U.S. Pat. No. 3,445,297. Generally, the Sidell structure comprises a housing having a compartment into which a battery is received and an ejector mechanism for displacing the battery from a position between a pair of terminals in the compartment, permitting subsequent removal. A specific aspect of the Sidell structure is that the battery ejector including a pair of lever arms be formed to the contour of the walls of the compartment within which the lever arms are disposed thereby to be unobtrusive. Thus, one lever arm of the ejector mechanism resides within an opening in a side wall while the other lever arm of the ejector mechanism resides within an opening in a bottom wall of the housing. The surface area of the side wall lever arm is substantially equal to the size of the opening. Thus, normally the ejector mechanism is concealed as an integral part of a continuous wall surface. Actuation of the ejector mechanism requires that a finger engage within a bevelled notch in an end and inwardly of the side wall lever arm whereby through exertion of pressure the lever arm may be pried from the wall. Unless the opening communicating with the notch is large resulting in excessive discontinuity in the wall, difficulty may be experienced in the operation of the ejector mechanism. This becomes a problem for individuals with large fingers in the successful use of the structure.

A further disadvantage of structures as described by Sidell is that the ejector mechanism is a component separable from the housing itself. Thus, if the ejector mechanism becomes separated from the housing the utility of the device is reduced substantially. To avoid this possibility additional securement may be required. This practice, together with the required operations of placing the ejector mechanism in the operative disposition, adds expense unnecessarily in the total fabrication of the device.

BRIEF DISCUSSION OF THE INVENTION

The present invention is an improvement over the prior art structures of which Sidell is representative in that it is described by a housing as will be more particularly discussed and an ejector mechanism which is formed integrally with the housing. Preferably, the structure of the present invention is of plastic molded to the desired outline thereby to define a compartment for receipt of the battery and including a hinge in one wall about which the ejector mechanism is capable of pivoting for partial ejection of the battery. One lever arm of the ejector mechanism extending from the hinge in a direction away from the compartment is engageable by a finger. The other lever arm extends in a different direction to a position below the battery. Positive action in the ejection of the battery accrues with relative ease through finger pressure being exerted on the engageable portion.

The structure of the present invention, also, through a unique construction of terminal assures that once the battery is ejected it cannot under its own weight return to a seated position within the compartment when the ejector mechanism no longer under pressure returns to its normal position.

These and other features of the present invention will become clear to those skilled in the art upon a reading of the following portion of the specification and a consideration of the drawing.

DESCRIPTION OF THE PREFERRED EMBODIMENT

Figure 1:
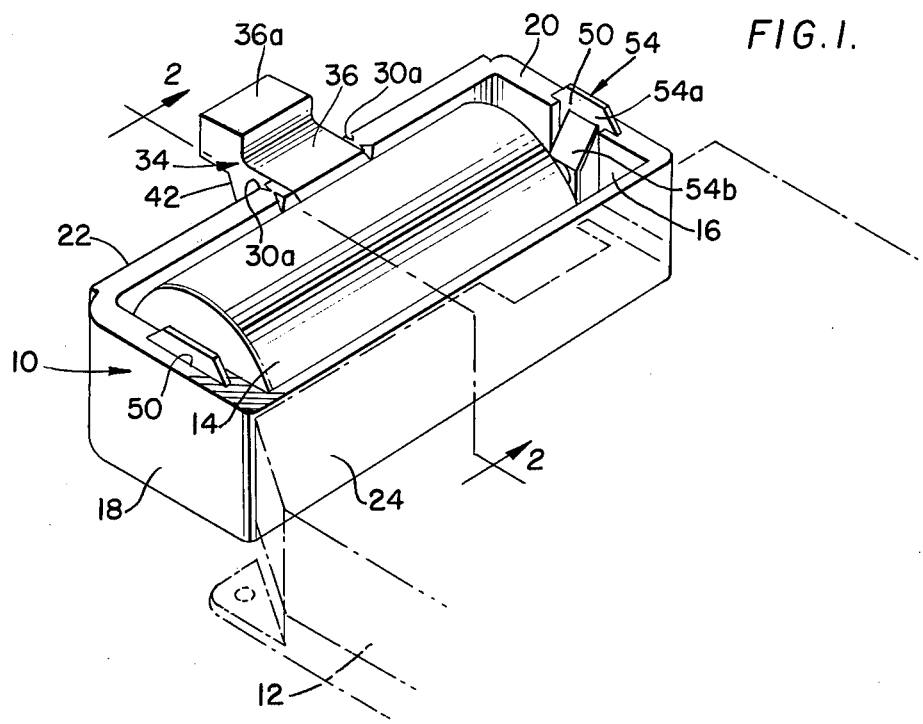
FIG. 1 is a perspective view of a housing for a battery and an ejector mechanism for partial ejection of the battery therefrom.

Referring to FIG. 1, a housing 10 is illustrated in association with a casing 12 (a portion of which is shown in phantom outline) providing, for example, an enclosure for a prime mover (not shown) and a gear train (also not shown) by which through suitable gear reduction the prime mover drives the hands of a clock. In this as others of possible adaptations of the structure of the present invention, the prime mover is powered by a source of direct current derived from a battery 14 received within a compartment 16 of the housing. Even though the prime mover may have relatively low power requirements it nevertheless at some time becomes necessary to remove the battery for replacement. The present invention provides a structure by which this action may be carried out.

The housing is fabricated of plastic and, preferably, a plastic which is capable of being molded or otherwise formed to the outline as will be described. Additionally, the plastic should be sturdy, it should display impact resistance capability, and, among other characteristics desired of molded plastic structures of the type herein, it should have some resilience whereby a portion of an upstanding wall may define a hinge about which an ejector mechanism may pivot for partial ejection of the battery from the compartment. Plastic materials which are suitable for use include Delrin 900 and Celcon M-90, both of which have been used successfully in the practice of this invention.

The housing includes a pair of side walls 18, 20 and for the sake of discussion a front wall 22 and a rear wall 24, each of which extend upwardly from a bottom wall 26. The front wall 22 includes a cutout 28 which is generally of the outline of a trapezoid whose non-parallel sides diverge outwardly from a hinge 30 at the opening to the compartment 16. The bottom wall 26, likewise, includes a cutout indicated at 32. The cutout is of T-shape outline. To this end, the arms extend between the side walls 18, 20 and the leg communicates with the cutout 28.

Figure 2:
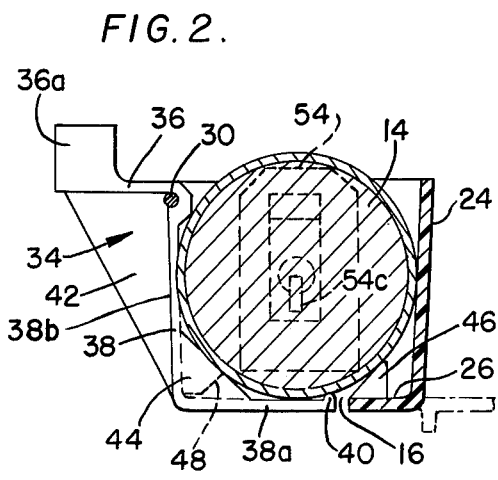
FIG. 2 is a vertical section as seen along the line 2—2 in FIG. 1.
Figure 3:
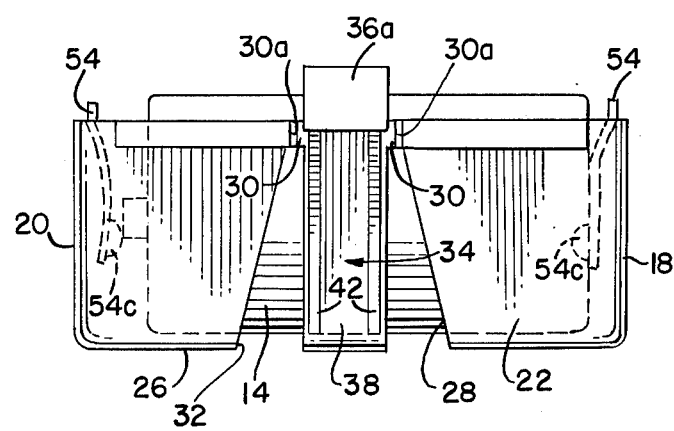
FIG. 3 is a view similar to FIG. 2 illustrating the manner of ejection of the battery.
Figure 4:
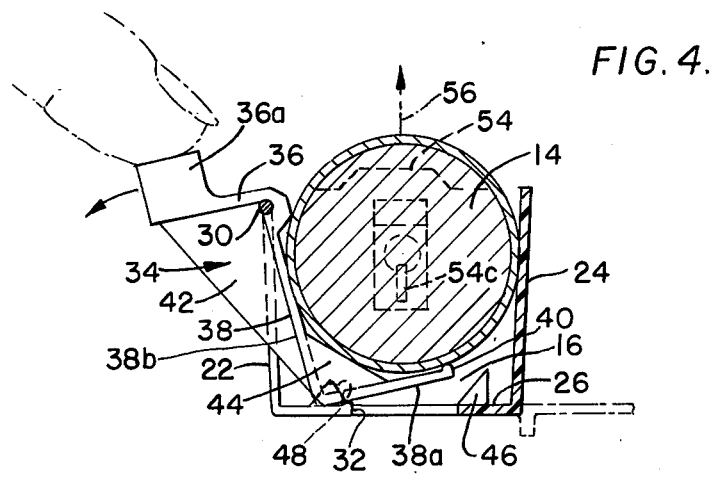
FIG. 4 is a rear elevational view of the housing and battery mechanism.

An ejector mechanism 34 is supported by the hinge 30 for movement within the cutouts 28 and 32 from the position of FIG. 2 to the position of FIG. 3 when it is desired to eject the battery 14 from compartment 16. The ejector mechanism which substantially is of Z-shaped outline in vertical section, includes a lever arm 36 having a finger engageable portion, 36a and a lever arm 38 having a battery engageable portion 38a and a connecting portion 38a. As indicated in the figures, the lever arm 36 extends generally outwardly of the front wall 22 while the lever arm 38 thereof extends first generally along the length of the front wall within the cutout 28 and then along the bottom wall 26 within the cutout 32. A raised tip 40 is formed at the end of the engageable portion 38a for contacting the battery 14.

For purposes of strength, a pair of spines 42 extend outwardly from the lever arm 38 between the engageable portion 36a and merging at the engageable portion 38a. A pair of ribs 44 extend inwardly from the lever arm 38. The ribs are disposed laterally outward of the spines and, additionally, serve to support the battery during ejection. The ribs 44, a pair of ribs 46 formed on the bottom wall at spaced dispositions along cutout 32 and ribs 48 similarly formed on the bottom wall although on the opposite side of the cutout provide a saddle for supporting the battery in the operative disposition.

Each of the side walls 18 and 20 is formed with a slot 50 which extends between the end of the side wall at the opening to the compartment 16 and the bottom wall 26. The slots are formed parallel to the surface of each side wall and communicate with the compartment by means of a cutout 52. A terminal 54 including a base 54a received in the slot and a spring arm 54b which extends through the cutout provides connection for the battery 14 in an electric circuit. Each spring arm further includes a raised rounded portion 54c which may be struck from or otherwise attached to the spring arm, for reasons as will appear.

In operation, a battery 14 is received in the compartment 16 and moved into the seated position thereby to be supported by the saddle formed by the several ribs. Through this action, the terminals of the battery move to a position in substantial alignment with the spring arm 54b of terminal 54. Particularly, the battery ends are engaged by the raised rounded portions 54c and the spring bias of the arms holds the battery in the seated position. The engagement of the raised rounded portion particularly with the terminal extension of the battery is within substantially the central to lower one-half.

When it is required to replace a worn battery 14, the individual exerts pressure on the finger engageable portion of lever arm 36. As indicated, the housing 10 may be associated with and stabilized by a casing 12 or other structure and since the plastic material has some resiliency through pressure on the lever arm 36 the hinge will undergo some degree of torsion. To assist in this action, the hinge 30 adjacent the sides of the ejector mechanism may be notched slightly at 30a. The notches may be provided on one or both sides of the front wall 22. During this operation the battery engageable portion of lever arm 38 (FIG. 3) engages the battery, forcing the battery in the direction of arrow 56. As may be seen, this action causes the terminal extension of battery 14 to ride over the raised rounded portion 54c on the spring arm 54b of terminal 54. While the plastic memory of the hinge results in return of the ejector mechanism 34 to the FIG. 2 position, the battery 14 will remain in a raised and somewhat tilted position (FIG. 3) to be grasped. To this end, the spring arm 54b adjacent the terminal extension of the battery through bias movement toward the other spring arm acts as an obstruction to movement of the battery under its own weight.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, what is claimed is:

1. In combination a housing and an ejection means adapted for ejection of a battery from a seated position in a compartment within said housing, said compartment formed by a plurality of side walls and a bottom wall which surround closely and substantially encase said battery, said ejection means including a member substantially of Z-shaped outline having first and second lever arms and a pivot axis therebetween, said pivot axis comprised of a hinge formed integral with one of said walls and said member and in the region of the entrance to said compartment, both said one wall and bottom wall having a cutout, said first lever arm extending from said hinge within said cutouts and terminating below said battery whereby upon pivot movement of said member said first lever arm moves within said cutout into the area of said compartment for ejection of said battery, and said second lever arm having a finger engaging surface laterally removed from said compartment.

2. The combination of claim 1 further comprising terminal means, means supporting said terminal means at the walls adjacent said one wall, said terminal means having an arm with a raised portion biased toward said compartment for resilient securement of said battery, and at least one of said raised portions providing an obstruction to return movement of said battery after ejection from said seated position.

3. The combination of claim 2 wherein said supporting means includes a slot in said walls and a cutout in said walls communicating each said slot and said compartment.

4. The combination of claim 2 including reinforcing means, said reinforcing means formed integrally with said member and supported between said first and second lever arms.

5. The combination of claim 2 including notch means, said notch means disposed in said hinge whereby said hinge more easily undergoes pivotal movement.

* * * * *